(12) United States Patent
Osuki

(10) Patent No.: US 10,032,013 B2
(45) Date of Patent: Jul. 24, 2018

(54) IMAGE FORMING APPARATUS COMMUNICATING WITH EXTERNAL DEVICE THROUGH NETWORK, NETWORK SYSTEM, METHOD OF CONTROLLING IMAGE FORMING APPARATUS, PROGRAM, AND STORAGE MEDIUM

(75) Inventor: Takashi Osuki, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 366 days.

(21) Appl. No.: 13/541,358

(22) Filed: Jul. 3, 2012

(65) Prior Publication Data

US 2013/0014240 A1    Jan. 10, 2013

(30) Foreign Application Priority Data

Jul. 7, 2011    (JP) ................................. 2011-150891

(51) Int. Cl.
*G06F 21/34* (2013.01)
*H04L 29/06* (2006.01)
*G06F 21/60* (2013.01)

(52) U.S. Cl.
CPC ............ *G06F 21/34* (2013.01); *G06F 21/608* (2013.01); *H04L 63/083* (2013.01); *H04L 63/0853* (2013.01); *H04L 63/10* (2013.01); *G06F 2221/2115* (2013.01)

(58) Field of Classification Search
CPC . G07F 7/10; G07F 7/122; G06F 21/34; G06F 21/445; G06F 21/70; G06Q 20/409; G06Q 20/367; H04L 63/10; H04L 63/12; H04L 63/0853; H04L 9/32

USPC ................... 713/159, 172, 185; 726/6, 9, 20
See application file for complete search history.

(56) References Cited

U.S. PATENT DOCUMENTS

| 8,483,662 | B2 * | 7/2013 | Kato .............................. 455/411 |
| 2005/0083812 | A1 * | 4/2005 | Miyamoto et al. .......... 369/53.2 |
| 2007/0107042 | A1 * | 5/2007 | Corona ............................. 726/2 |
| 2009/0109476 | A1 | 4/2009 | Ando |
| 2009/0180141 | A1 * | 7/2009 | Takaishi ............. G03G 15/5075 358/1.15 |
| 2010/0050247 | A1 | 2/2010 | Hashimoto |
| 2010/0079805 | A1 | 4/2010 | Hashimoto |
| 2010/0250971 | A1 * | 9/2010 | Walmsley ............ B41J 2/17503 713/194 |

(Continued)

FOREIGN PATENT DOCUMENTS

| CN | 101779212 A | 7/2010 |
| JP | 2002-287932 A | 10/2002 |

(Continued)

*Primary Examiner* — Hadi S Armouche
*Assistant Examiner* — Paul Callahan
(74) *Attorney, Agent, or Firm* — Canon U.S.A., Inc. IP Division

(57) ABSTRACT

An image forming apparatus configured to communicate with an authentication apparatus through a network, the image forming apparatus including: an acquisition unit configured to acquire a user ID through the network; a transmission unit configured, when the user ID is acquired by the acquisition unit, to transmit an authentication request including a user ID to the authentication apparatus through the network; and a control unit configured to allow the user to log in to the image forming apparatus according to an authentication result in response to the transmitted authentication request.

28 Claims, 6 Drawing Sheets

(56) References Cited

U.S. PATENT DOCUMENTS

2011/0203005 A1* 8/2011 Hamada .......................... 726/28
2014/0115660 A1* 4/2014 Chinta ................ G06F 21/6218
                                                                                                726/1

FOREIGN PATENT DOCUMENTS

| JP | 2009-93626 A | 4/2009 |
| JP | 2010-055522 A | 3/2010 |

* cited by examiner

IMAGE FORMING APPARATUS COMMUNICATING WITH EXTERNAL DEVICE THROUGH NETWORK, NETWORK SYSTEM, METHOD OF CONTROLLING IMAGE FORMING APPARATUS, PROGRAM, AND STORAGE MEDIUM

BACKGROUND OF THE INVENTION

Field of the Invention

The present invention relates to a network authentication system which performs authentication of a user who uses an image forming apparatus based on user information received through a network.

Description of the Related Art

A user authentication system for an image forming apparatus including a conventional print function and facsimile function performs authentication using an integrated circuit (IC) card, for example. According to such an authentication system, an IC card is used to perform authentication by using a user identifier (ID) associated with card information on the IC card and log in to the image forming apparatus. In the user authentication system, card information including user information is stored in a storage medium such as an IC card. The card information read from an IC card reader corresponding to the IC card is used for user authentication.

Japanese Patent Application Laid-Open No. 2009-93626 discusses a configuration in which an image processing apparatus acquires card information read by an IC card reader through an interface such as a universal serial bus (USB) and the Institute of Electrical and Electronics Engineers (IEEE) 1394.

SUMMARY OF THE INVENTION

The present invention is directed to providing an image forming apparatus that suitably performs authentication based on information received through a network interface.

According to an aspect of the present invention, an image forming apparatus includes: a network interface; a local interface; a storage unit configured to store a user identifier (ID) received from the network interface or the local interface; and a control unit configured to transmit an authentication request including the user ID stored in the storage unit to an authentication apparatus and allow a user corresponding to the user ID to log in based on an authentication result received from the authentication apparatus, wherein the control unit performs control so that a user ID received from the network interface and a user ID received from the local interface are stored into the common storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
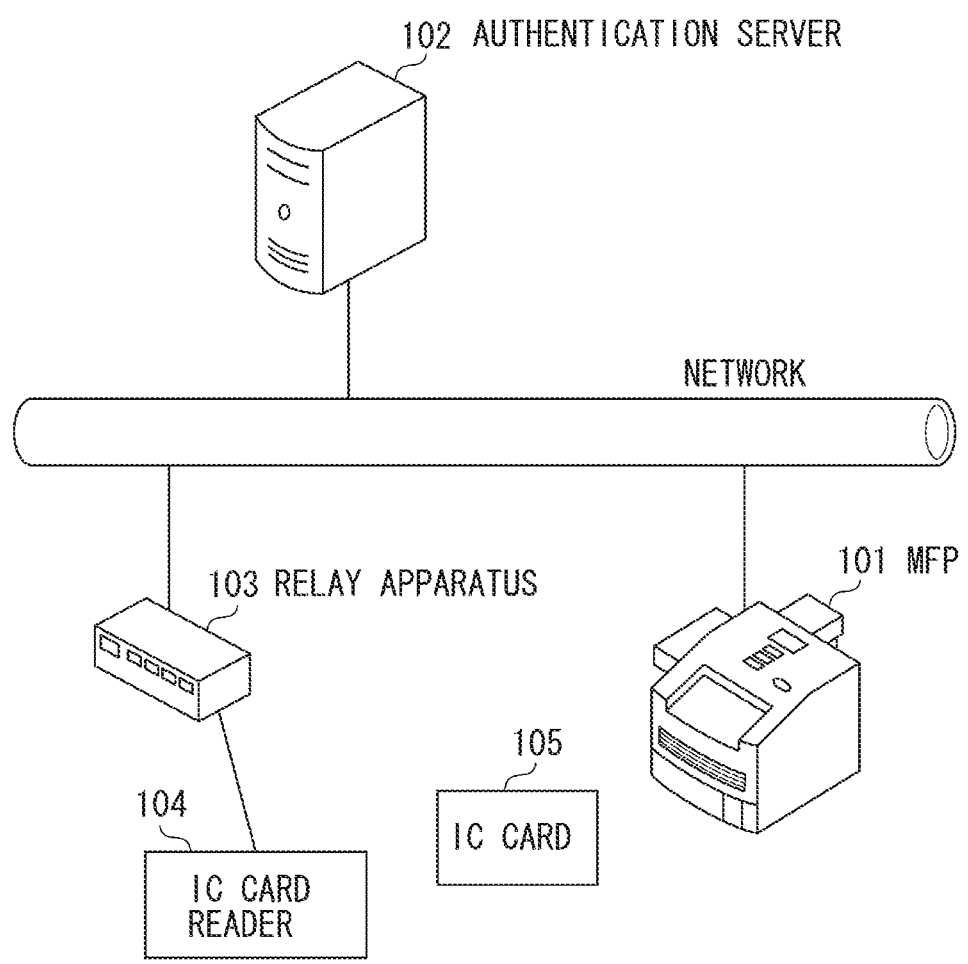
FIG. 1 is a schematic diagram illustrating an authentication system that includes a multi function peripheral (MFP) (image forming apparatus), a card reader, and an authentication server.

A first exemplary embodiment will be described. FIG. 1 is a diagram illustrating an outline of an authentication system according to the first exemplary embodiment. The authentication system includes an MFP 101, an authentication server 102, and a relay apparatus 103 which are communicably connected through a network.

The MFP 101 is an example of an image forming apparatus. As will be described later in FIG. 2, the MFP 101 is a multifunctional apparatus that can perform printing, facsimile transmission, and copying according to operations of a log-in user who has been authenticated based on card information.

The authentication server 102 is an apparatus that performs authentication based on the card information read from an IC card 105. The authentication server 102 transfers the card information transmitted from the relay apparatus 103 to the MFP 101, and performs authentication according to an authentication request from the MFP 101.

The authentication server 102 contains a table that associates IP addresses (or host names) as identification information of MFPs 101 with pieces of information for identifying relay apparatuses 103 on a one-to-one basis. Having such a table, the authentication server 102 can transfer the card information.

The relay apparatus 103 connects one or a plurality of IC card readers 104 through a USB interface(s) and controls the IC card reader(s) 104. The relay apparatus 103 includes a plurality of types of USB host drivers. As a result, the relay apparatus 103 can connect and control IC card readers 104 provided by various third vendors. A USB host driver corresponding to an IC card reader 104 transmits commands to the IC card reader 104 for control. The relay apparatus 103 is not only connected to an IC card reader(s) 104 through a USB interface(s) but is also connected so that data can be transmitted and received through transmission control protocol/internet protocol (TCP/IP) network communication protocols. When an IC card reader 104 reads the card information stored in an IC card 105, the relay apparatus 103 transmits the card information to a previously-registered authentication server 102 through the network. The card information transmitted to the authentication server 102 includes a user ID and a password for identifying a user, and an ID of a division to which the user belongs.

Upon receiving an authentication request including the card information from the MFP 101, the authentication server 102 accesses authentication information that is managed on the authentication server 102. The authentication server 102 searches for a user name associated with the card information included in the authentication request, and returns an authentication result (OK or NG) to the MFP 101 that has issued the authentication request.

The present exemplary embodiment deals with the case where the relay apparatus 103 and the authentication server 102 are different apparatuses. However, such a plurality of apparatuses may be integrated into one apparatus. For example, the relay apparatus 103 may also have functions as an authentication server 102.

Figure 2:
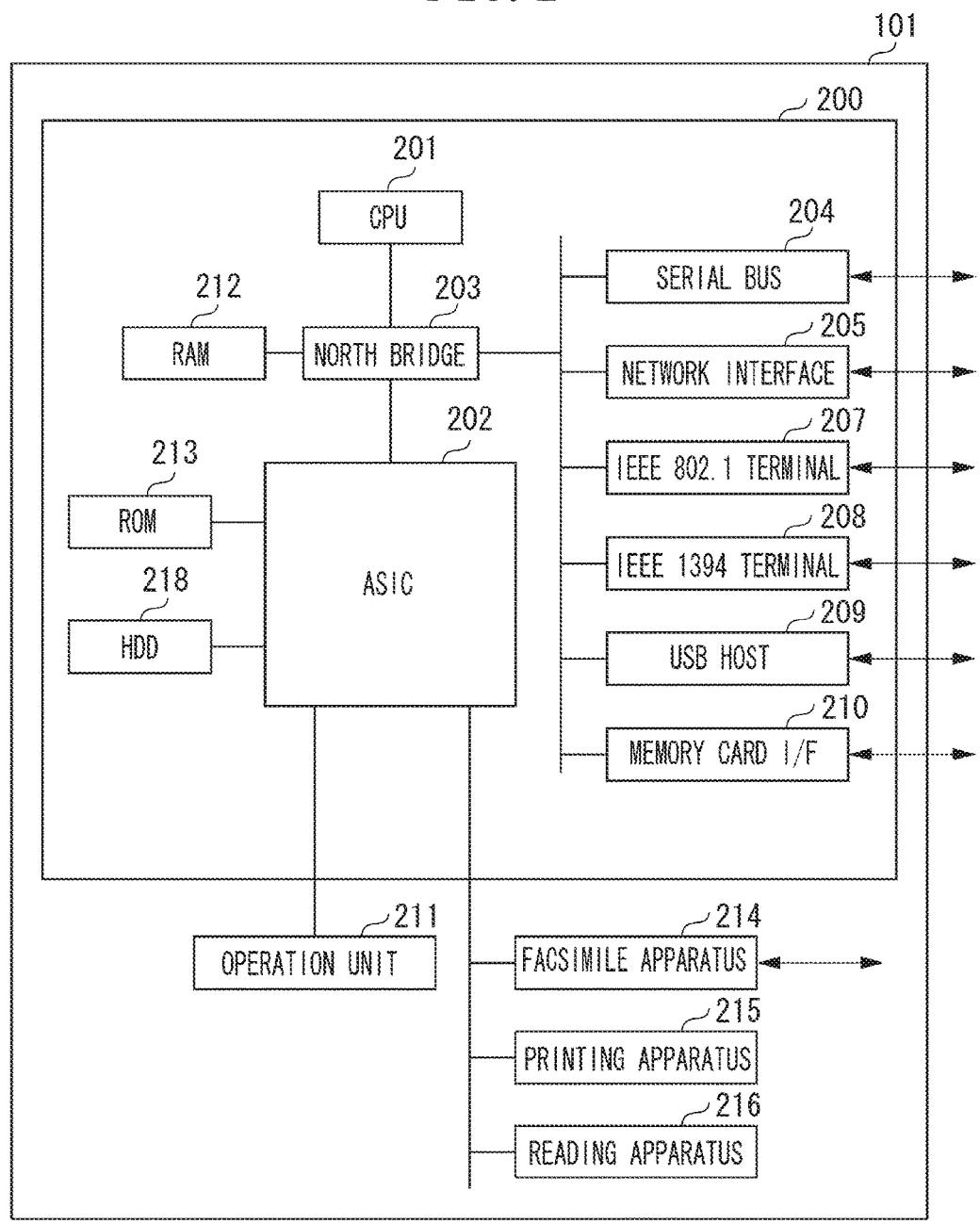
FIG. 2 is a block diagram illustrating a hardware configuration of the MFP.

FIG. 2 is a block diagram illustrating a hardware configuration of the MFP 101 illustrated in FIG. 1.

The MFP 101 includes a controller 200, an operation unit 221, a facsimile apparatus 214, a printing apparatus 215, and a reading apparatus 216. The controller 200 controls the MFP 101. The operation unit 211 accepts user operations. The facsimile apparatus 214 transmits and receives facsimile data. The printing apparatus 215 prints image data. The reading apparatus 216 reads documents.

The controller 200 includes a central processing unit (CPU) 201, an application specific integrated circuit (ASIC) 202, a north bridge 203, a random access memory (RAM) 212, a read-only memory (ROM) 213, and a hard disk drive (HDD) 218. The controller 200 further includes interfaces 204 to 210 intended for data communication with external devices.

The CPU 201 is a processor that controls the entire apparatus. The RAM 212 provides a work area for the CPU 201 and also serves as a memory for temporarily storing image data. The ROM 213 contains a program for executing the steps of a flowchart to be described later.

The network interface 205 is an interface for communicating with the authentication server 102 and other network devices through a network. The IEEE 802.1 terminal 207 is an interface to be used in wireless local area network (LAN) communications. The USB host 209 is an interface for connecting an IC card reader 104 through a USB cable. Such interfaces are connected to the north bridge 203.

Figure 3:
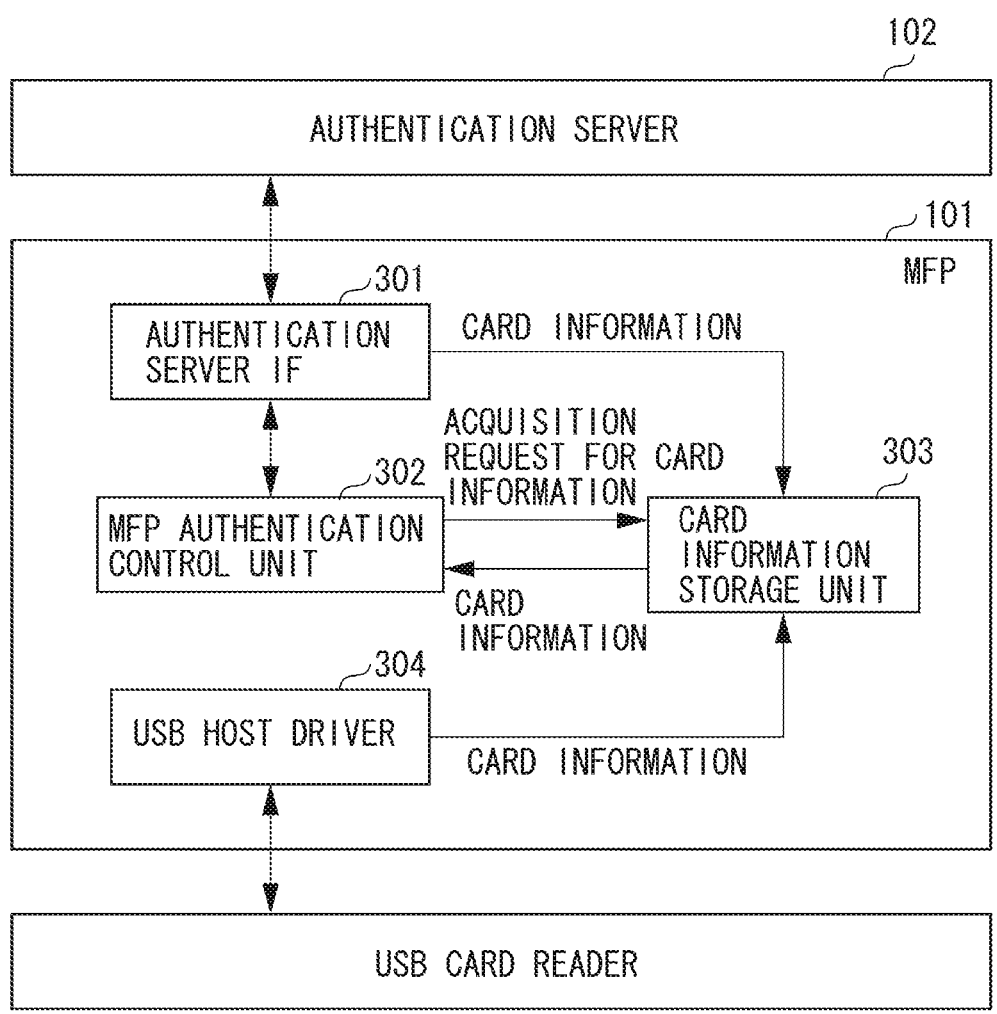
FIG. 3 is a diagram illustrating a software configuration of the MFP.

FIG. 3 is a functional block diagram of the authentication system illustrated in FIG. 1. An authentication server interface (IF) unit 301, an MFP authentication control unit 302, a card information storage unit 303, and a USB host driver 304 illustrated in FIG. 3 are implemented by a control program stored in the ROM 213 being loaded into the RAM 212 and executed by the CPU 201.

The authentication server IF unit 301 is a software module for controlling communication between the MFP 101 and the authentication server 102. The authentication server IF unit 301 has the following two functions. One is to temporarily store the card information received from the authentication server 102 into the card information storage unit 303. The other is to transmit an authentication request including the card information received from the MFP authentication control unit 302 to the authentication server 102.

The MFP authentication control unit 302 is a software module for performing processing that is needed for the authentication server 102 to authenticate a user, and managing the state of the MFP 101.

Specifically, the MFP authentication control unit 302 checks the card information storage unit 303 for stored card information at predetermined intervals. The card information stored in the card information storage unit 303 has been received through either the network interface 205 or a USB interface. If the card information is stored, the MFP authentication control unit 302 determines whether the MFP 101 is in a state capable of user log-in. If the MFP 101 is in a state capable of user log-in, the MFP authentication control unit 302 requests authentication from the authentication server 102 based on the stored card information.

Subsequently, upon receiving an authentication result that indicates "OK" (i.e., successful authentication) from the authentication server 102, the MFP authentication control unit 302 changes the state of the MFP 101 to one where the user associated with the card information has logged in to the MFP 101.

If the HDD 218 or an external storage device (not illustrated) contains a print job pertaining to the log-in user in an authentication wait state, the MFP 101 executes the print job and performs printing in response to the log-in of the user.

Now, if the authentication result received from the authentication server 102 indicates "NO" (i.e., failed authentication), the MFP authentication control unit 302 notifies the user by on-screen display that the log-in to the MFP 101 is not allowed.

The card information storage unit 303 is a software module having the function of storing card information received from either one of the authentication server IF unit 301 and the USB host driver 304 into the RAM 212. The card information storage unit 303 also has the function of returning the card information according to an acquisition request for the card information from the MFP authentication control unit 302. If the card information storage unit 303 already stores the card information when the card information is transmitted from another module, the card information storage unit 303 overwrites the stored card information with the transmitted card information. In other words, the card information storage unit 303 always stores only the latest card information, not a plurality of pieces of the card information. For example, if the card information storage unit 303 already stores card information received from the USB host driver 304 and then receives new card information from the authentication server IF unit 301, the card information storage unit 303 deletes the card information received from the USB host driver 304. The card information storage unit 303 then stores only the card information received from the authentication server IF unit 301.

The present exemplary embodiment is configured so that the card information is stored into the same card information storage unit 303 both when the authentication server IF unit 301 receives the card information through the network interface 205 and when the USB host driver 304 receives the card information through the USB host 209. Once the card information is stored in the card information storage unit 303, the same authentication procedure is performed regardless of where the card information is received from. More specifically, the procedure for transmitting an authentication request based on the card information stored in the card information storage unit 303 and performing processing according to an authentication result is performed according to the common procedure both when the authentication server IF unit 301 receives the card information through the network interface 205 and when the USB host driver 304 receives the card information through the USB host 209.

Figure 4:
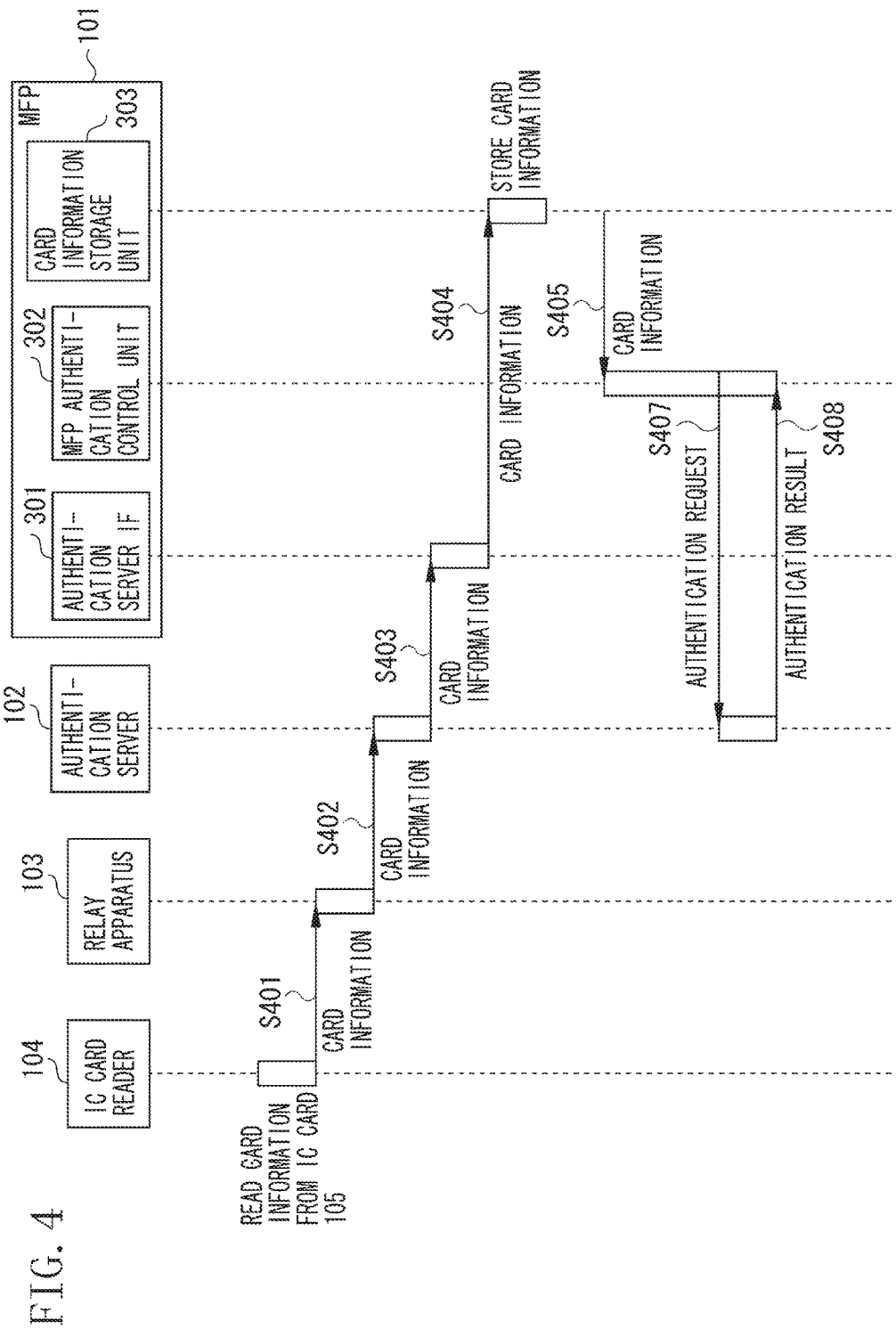
FIG. 4 is a sequence chart illustrating an authentication procedure based on card information received from a relay apparatus according to an exemplary embodiment.

FIG. 4 is a sequence chart illustrating a procedure by which the authentication server 102 performs authentication when a user who uses the MFP 101 holds an IC card 105 over an IC card reader 104 that is connected to the network.

Initially, the user holds an IC card 105 over an IC card reader 104. The IC card reader 104 reads the card information stored in the IC card 105. In step S401, the IC card reader 104 transmits the read card information to the relay apparatus 103.

In step S402, the relay apparatus 103 transmits the information of the IC card 105 acquired from the IC card reader 104 to a predetermined authentication server 102 through the network. In step S403, the authentication server 102 notifies the MFP 101 of the information of the IC card 105 transmitted from the relay apparatus 103 as described above. At this point in time, the authentication server 102 will not perform authentication by using the received card information.

The authentication server IF unit 301 of the MFP 101 identifies and receives data that includes the card information from the authentication server 102 from among a large number of pieces of data transmitted and received over the network. In step S404, the authentication server IF unit 301 once stores the card information received from the authentication server 102 into the card information storage unit 303. If the card information storage unit 303 already stores the card information, the card information storage unit 303 overwrites the stored card information with the new card information received from the authentication server IF unit 301. In other words, the card information storage unit 303 is configured to store only a single piece of card information.

The MFP authentication control unit 302 checks the card information storage unit 303 for stored card information at predetermined intervals. If card information is stored, then in step S405, the MFP authentication control unit 302 acquires the card information from the card information storage unit 303. The MFP authentication control unit 302 then checks whether the MFP 101 is in a state capable of authentication (authenticatable state). What an authenticatable state is like will be concretely described later in conjunction with step S603 of FIG. 6. If the MFP 101 is in an authenticatable state, then in step S407, the MFP authentication control unit 302 transmits an authentication request including the acquired card information to the authentication server 102.

The authentication server 102 performs authentication based on the card information that is included in the authentication request received from the MFP 101. In step S408, the authentication server 102 transmits the authentication result or an access key issued by the authentication server 102 to the MFP 101. According to the authentication result received, the MFP 101 performs log-in and executes a print job in response to the log-in.

Figure 5:
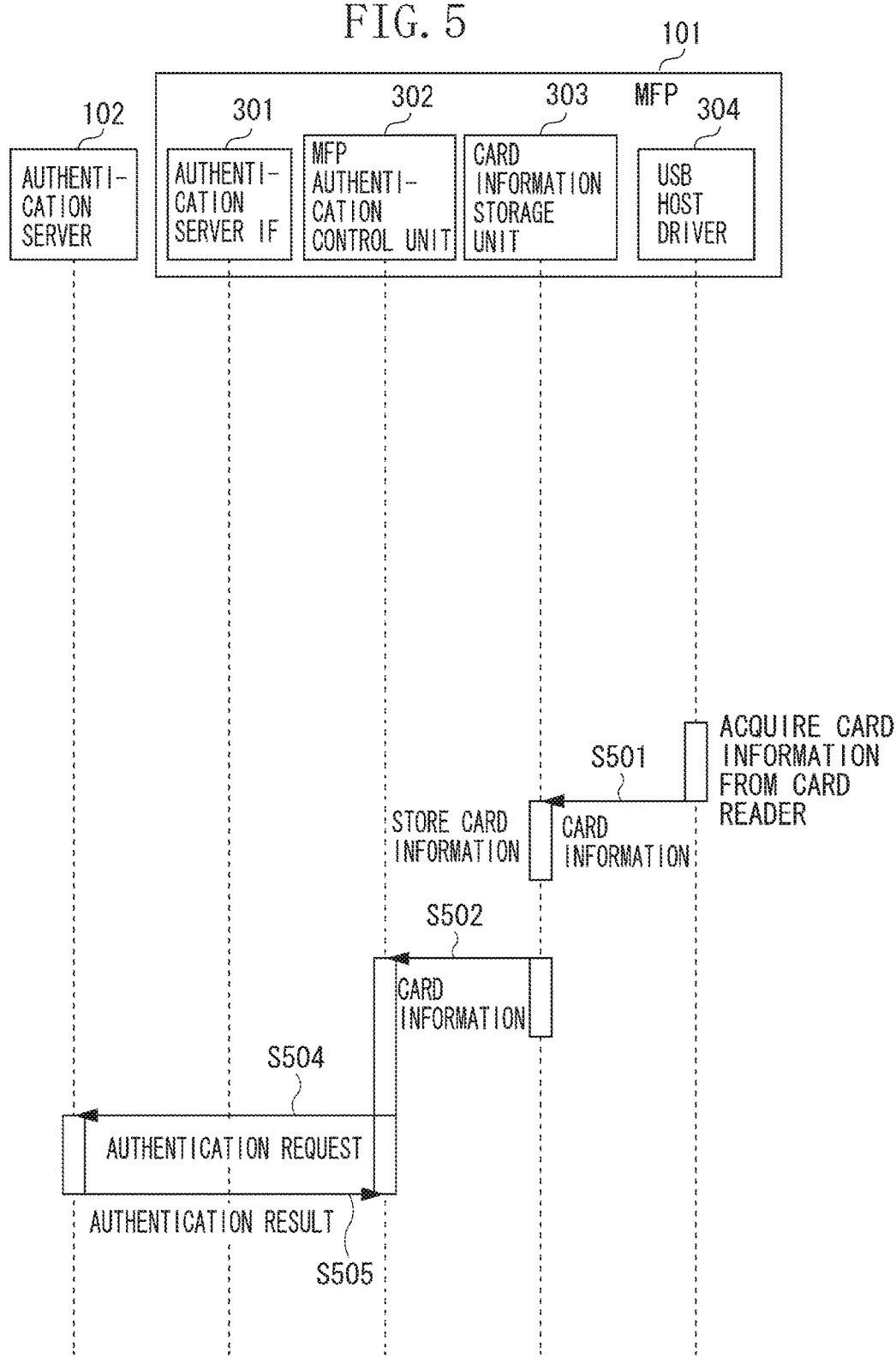
FIG. 5 is a sequence chart illustrating an authentication procedure based on the card information received from a USB host according to the exemplary embodiment.

FIG. 5 is a sequence chart illustrating a procedure for authentication processing when card information is received through a USB interface. In the system configuration illustrated in FIG. 1, the IC card reader 104 is connected to the relay apparatus 103. The following description will be given on the assumption that an IC card reader different from the IC card reader 104 is connected to the USB host 209 of the MFP 101 through a USB cable.

In step S501, the USB host driver 304 initially acquires card information from the different IC card reader (not illustrated), and stores the acquired card information into the card information storage unit 303. If the card information storage unit 303 already stores card information, the stored card information is deleted and overwritten with the card information transmitted in step S501.

Next, the MFP authentication control unit 302 checks the card information storage unit 303 for stored card information at predetermined intervals. If card information is stored, then in step S502, the MFP authentication control unit 302 acquires the card information from the card information storage unit 303. The MFP authentication control unit 302 checks whether the MFP 101 is in an authenticatable state. If the MFP 101 is in an authenticatable state, then in step S504, the MFP authentication control unit 302 transmits an authentication request including the card information acquired in step S502 to the authentication server 102.

The authentication server 102 performs authentication based on the card information that is included in the authentication request received from the MFP 101. In step S505, the authentication server 102 transmits the authentication result or an access key issued by the authentication server 102 to the MFP 101. According to the authentication result received, the MFP 101 performs log-in and executes a print job in response to the log-in.

Steps S502 to S505 of FIG. 5 are processing corresponding to steps S405 to S408 of FIG. 4.

Figure 6:
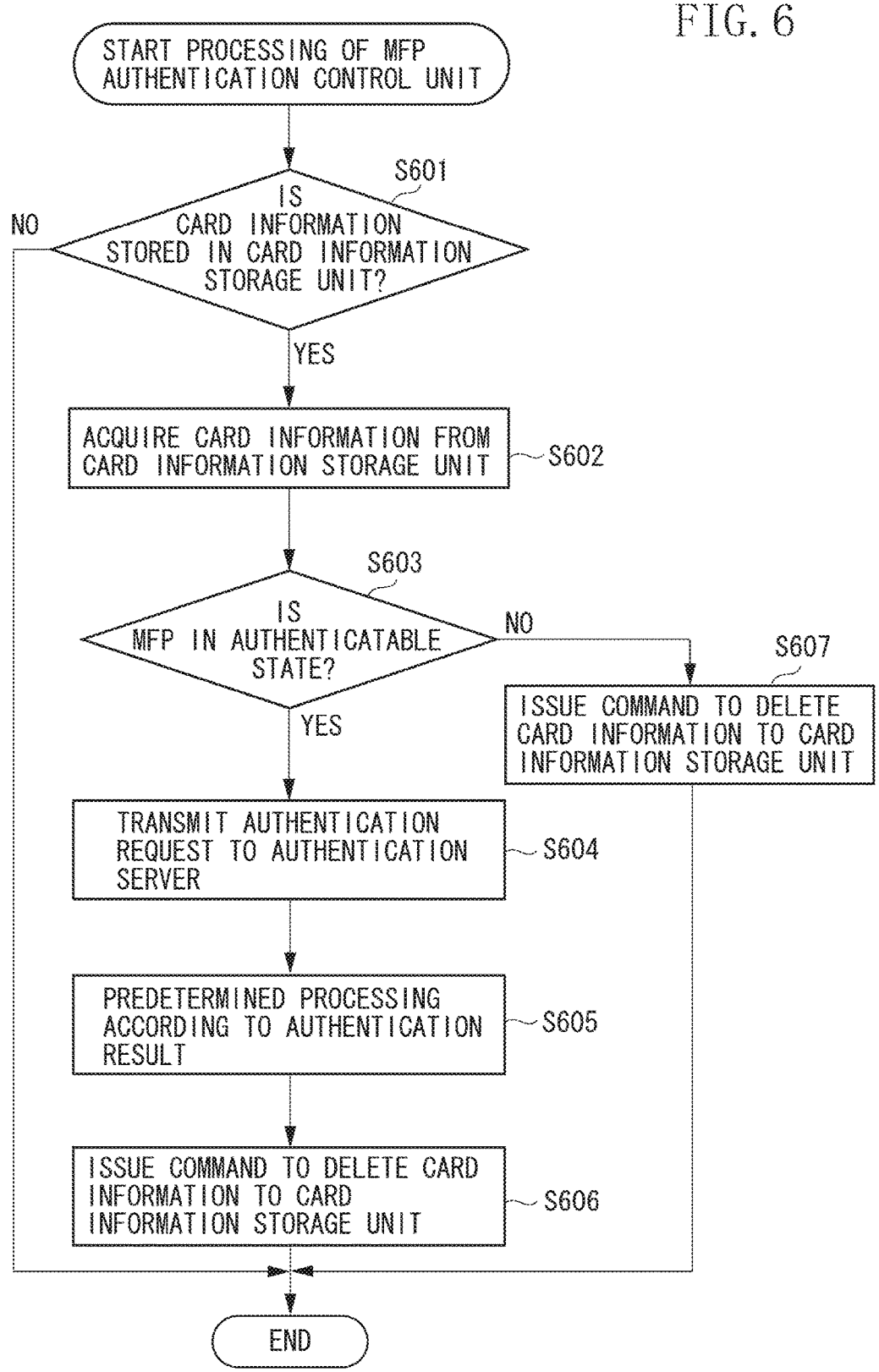
FIG. 6 is a flowchart illustrating processing of the MFP.

FIG. 6 is a flowchart illustrating processing of the MFP authentication control unit 302 of the MFP 101. The MFP authentication control unit 302 performs the processing illustrated in FIG. 6 at regular intervals.

In step S601, the MFP authentication control unit 302 initially inquires whether card information is stored in the card information storage unit 303. If the result of the inquiry shows that card information is stored in the card information storage unit 303 (i.e., card information has been written from either the network or the USB host driver 304; YES in step S601), the MFP authentication unit 302 proceeds to step S602.

In step S602, the MFP authentication control unit 302 acquires the card information from the card information storage unit 303. As described previously, the acquired card information includes information such as a user ID and a password for identifying a user and an ID of a division to which the user belongs.

In step S603, the MFP authentication control unit 302 determines whether the MFP 101 is in a state capable of authentication (authenticatable state) or a state incapable of authentication. In the present exemplary embodiment, a state incapable of authentication refers to the following: a state where the MFP 101 has already been making an authentication request to the authentication server 102; a state where the MFP 101 has not been operated for certain time and has entered a power conservation state (sleep state); a power saving state; a maintenance state; a state where authentication services of the authentication server 102 are suspended; and a state where a job is under execution. On the other hand, a state capable of authentication processing (authenticatable state) refers to states other than the foregoing. An example is a state where the MFP 101 is on standby.

If, in step S603, the MFP 101 is determined to be in an authenticatable state (YES in step S603), the MFP authentication control unit 302 proceeds to processing of step S604. On the other hand, if the MFP 101 is determined not to be in an authenticatable state (NO in step S603), the MFP authentication control unit 302 proceeds to step S607 to delete the card information stored in the card information storage unit 303. Specifically, the MFP authentication control unit 302 issues a command to delete card information to the card information storage unit 303. The card information storage unit 303 deletes the card information according to the command.

If, in step S603, the MFP 101 is determined to be in an authenticatable state (YES in step S603), then in step S604, the MFP authentication control unit 302 transmits an authentication request including the card information acquired in step S602 to the authentication server 102. Based on the authentication request transmitted in step S604, the authentication server 102 determines whether to authorize the user who is associated with the card information to use the MFP 101.

In step S605, the MFP authentication control unit 302 receives from the authentication server 102 an authentication result corresponding to the authentication request transmitted in step S604. According to the received authentication result, the MFP authentication control unit 302 then performs predetermined processing such as log-in and execution of a print job in response to the log-in. Upon completing the predetermined processing in step S605, in step S606, the MFP authentication control unit 302 issues a command to delete card information to the card information storage unit 303. According to the command, the card information storage unit 303 deletes the card information.

As described above, the MFP 101 according to the present exemplary embodiment is configured to receive card information read by the IC card reader 104 through the relay apparatus 103 connected to the network. With such a configuration, a plurality of types of USB device drivers need not be installed in the MFP 101 and the entire system can accept various types of IC card readers as long as the plurality of types of USB device drivers are installed in the relay apparatus 103.

The present exemplary embodiment is configured so that the card information transmitted from the relay apparatus 103 through the authentication server 102 is stored into the MFP 101, and the MFP 101 requests authentication from the authentication server 102 at timing when the MFP 101 enters a state capable of authentication. Such a configuration can prevent an authentication result from being transmitted from the network at timing when the MFP 101 is in a state incapable of authentication.

The present exemplary embodiment is also configured so that the card information transmitted from the relay apparatus 103 through the network and the card information directly read by the MFP 101 through a USB interface are stored into the common card information storage unit 303. After card information is stored, the same authentication procedure is performed regardless of which interface the card information is received from. For example, suppose that a system that receives card information from a USB interface and performs authentication has already been implemented in a product. Such a product may be simply extended to store card information received from a network interface into the same card information storage unit. This can constitute a configuration like the foregoing exemplary embodiment with a significant reduction in the development cost.

The MFP 101 according to the present exemplary embodiment is configured to enter the same log-in state both when card information is received through a USB interface and when card information is received through the network. From the user's point of view, authentication performed based on card information that is transferred from the relay apparatus 103 on the network can thus be handled as if the authentication is performed based on card information received through the USB host 209. This precludes confusion of the user.

In the present exemplary embodiment, the common authentication server 102 performs both the processing of transferring card information in order to notify card information from the relay apparatus 103 to the MFP 101 and the authentication processing according to an authentication request from the MFP 101. However, the processing of transferring card information transmitted from the relay apparatus 103 and the authentication processing according to an authentication request from the MFP 101 may be performed by respective different apparatuses.

The present exemplary embodiment has dealt with a USB interface as an example of a local interface. However, interfaces other than a USB interface may be used. For example, the IEEE 802.1 terminal 207 intended for wireless LAN and the IEEE 1394 terminal 208 for connecting a computer to peripheral equipment, illustrated in FIG. 2, may be used.

The present exemplary embodiment has dealt with examples of the cases where card information is received through a local interface and where card information is received through a network interface. The interfaces are not limited thereto as long as the two interfaces are of respective different types.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., non-transitory computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-150891 filed Jul. 7, 2011, which is hereby incorporated by reference herein in its entirety.

What is claimed is:

1. An image forming apparatus capable of communicating with an authentication server via a network, the image forming apparatus comprising:
   one or more processors; and
   one or more computer-readable media storing instructions that, when executed by the one or more processors, cause the one or more processors to perform operations comprising:
      receiving card information via a network interface, the card information being read from an IC card by an IC card reader, wherein the card information is received via the network interface without an authentication process using the card information being performed;
      storing the card information received via the network interface into a card information storage area;
      determining, in a case where the card information is stored in the card information storage area, whether or not the image forming apparatus is in an authenticatable state;
      in a case where it is determined that the image forming apparatus is in the authenticatable state, transmitting an authentication request to the authentication server based on the card information stored in the card information storage area, the authentication request including the card information received via the network interface;

in a case where it is determined that the image forming apparatus is not in the authenticatable state, deleting the card information stored in the card information storage area without transmitting the authentication request to the authentication server;

allowing a user corresponding to the card information stored in the card information storage area to log into the image forming apparatus according to an authentication result from the authentication server; and executing a print job of the user who is allowed to log into the image forming apparatus.

2. The image forming apparatus according to claim 1, wherein the card information includes at least any one of a user ID, a password, and a division ID.

3. The image forming apparatus according to claim 2, wherein the card information received from the network interface and card information received from a local interface of the image forming apparatus are stored into a common storage device.

4. The image forming apparatus according to claim 2, wherein the card information is new card information that is received from the network interface while other card information received from a local interface of the image forming apparatus is stored in the card information storage area, and wherein the storing the card information comprises overwriting the other card information stored in the card information storage area with the new card information received from the network interface.

5. The image forming apparatus according to claim 2, wherein a local interface of the image forming apparatus is configured to receive card information, and wherein the local interface performs data communication according to a USB protocol.

6. The image forming apparatus according to claim 1, wherein the authenticatable state is a state while the image forming apparatus does not execute a job, or a state while the image forming apparatus is not under a power saving condition.

7. The image forming apparatus according to claim 1, the operations further comprising:

in a case where the authentication request is transmitted to the authentication server, deleting the card information stored in the storage area after the allowing the user to log into the image forming apparatus.

8. A network system comprising:
a card reader;
a relay apparatus configured to transfer card information read from the card reader to an authentication server through a network, wherein the authentication server is configured to transfer the card information from the relay apparatus to an image forming apparatus; and
the image forming apparatus, wherein the image forming apparatus is capable of communicating with the authentication server via the network,
wherein the image forming apparatus includes:
a receiving unit configured to receive the card information via a network interface, the card information being read from an IC card by the card reader, wherein the card information is received via the network interface without an authentication process using the card information being performed;
a card information storage unit configured to store the card information received by the receiving unit via the network interface; and
a control unit configured to determine, in a case where the card information is stored in the card information storage unit, whether or not the image forming apparatus is in an authenticatable state, wherein the control unit is configured to transmit, in a case where it is determined that the image forming apparatus is in the authenticatable state, an authentication request to the authentication server based on the card information stored in the card information storage unit, the authentication request including the card information received via the network interface, delete the card information stored in the card information storage unit without transmitting the authentication request to the authentication server, in a case where it is determined that the image forming apparatus is not in the authenticatable state, and allow a user to log into the image forming apparatus based on an authentication result from the authentication server.

9. The network system according to claim 8, wherein the relay apparatus transfers the card information to the image forming apparatus through the authentication server.

10. The network system according to claim 8, wherein the relay apparatus is connected to the card reader through a USB interface.

11. The network system according to claim 8, wherein the image forming apparatus further includes an execution unit configured to execute a print job of a user in response to log-in of the user.

12. The network system according to claim 8, wherein the card information includes at least any one of a user ID, a password, and a division ID.

13. The network system according to claim 8, wherein the image forming apparatus further includes a local interface configured to receive card information.

14. The network system according to claim 13, wherein the local interface performs data communication according to a USB protocol.

15. The network system according to claim 13, wherein the card information storage unit is configured to store the card information received from the local interface and the card information received from the network interface.

16. The network system according to claim 15, wherein the control unit is configured, when the image forming apparatus is in a power saving state or a maintenance state, to delete the card information stored in the card information storage unit.

17. The network system according to claim 8, wherein the control unit is configured, when the image forming apparatus is in a standby state, to transmit the authentication request.

18. A method of controlling an image forming apparatus capable of communicating with an authentication server via a network, the method comprising:

receiving card information via a network interface, the card information being read from an IC card by an IC card reader, wherein the card information is received via the network interface without an authentication process using the card information being performed;

storing the card information received via the network interface into a card information storage area;

determining, in a case where the received card information is stored in the card information storage area, whether or not the image forming apparatus is in an authenticatable state;

performing control to transmit, in a case where it is determined that the image forming apparatus is in the authenticatable state, an authentication request to the authentication server based on the card information stored in the card information storage area, the authentication request including the card information received via the network interface, delete the card information stored in the card information storage area without transmitting the authentication request to the authentication server, in a case where it is determined that the image forming apparatus is not in the authenticatable state, and allow a user corresponding to the stored card information to log into the image forming apparatus according to an authentication result from the authentication server; and executing a print job of the user who is allowed to log in by the performing of control.

19. A method of controlling a network system including an image forming apparatus and a relay apparatus, the image forming apparatus capable of communicating with an authentication server via a network, the method comprising:
transferring card information read from a card reader from the relay apparatus to the authentication server through the network;
receiving, by the image forming apparatus, the card information from the authentication server via a network interface, the card information being read from an IC card by the card reader, wherein the card information is received via the network interface without an authentication process using the card information being performed;
storing the card information received via the network interface on the image forming apparatus;
determining, in a case where the received card information is stored on the image forming apparatus, whether or not the image forming apparatus is in an authenticatable state; and
performing control to transmit, in a case where it is determined that the image forming apparatus is in the authenticatable state, an authentication request to the authentication server based on the card information stored on the image forming apparatus, the authentication request including the card information received via the network interface, delete the card information stored on the image forming apparatus without transmitting the authentication request to the authentication server, in a case where it is determined that the image forming apparatus is not in the authenticatable state, and allow a user to log into the image forming apparatus based on an authentication result from the authentication server.

20. A non-transitory computer-readable storage medium storing instructions for causing an image forming apparatus capable of communicating with an authentication server via a network, to perform operations comprising:
receiving card information via a network interface, the card information being read from an IC card by an IC card reader, wherein the card information is received via the network interface without an authentication process using the card information being performed;
storing the card information received via the network interface into a card information storage area;
determining, in a case where the received card information is stored in the card information storage area, whether or not the image forming apparatus is in an authenticatable state;
performing control to transmit, in a case where it is determined that the image forming apparatus is in the authenticatable state, an authentication request to the authentication server based on the card information stored in the card information storage area, the authentication request including the card information received via the network interface, delete the card information stored in the card information storage area without transmitting the authentication request to the authentication server, in a case where it is determined that the image forming apparatus is not in the authenticatable state, and allow a user corresponding to the stored card information to log into the image forming apparatus according to an authentication result from the authentication server; and executing a print job of the user who is allowed to log in by the performing of control.

21. The image forming apparatus according to claim 1, wherein the receiving the card information via the network interface comprises receiving the card information from the authentication server via the network interface.

22. The image forming apparatus according to claim 21, wherein the card information from the authentication server comprises card information that the authentication server received and then, without performing an authentication process using the card information, transmitted to the image forming apparatus.

23. The image forming apparatus according to claim 21, wherein the authentication request includes the card information from the authentication server, the card information usable by the image forming apparatus to obtain the authentication result by transmitting the authentication request including the card information to the authentication server.

24. The image forming apparatus according to claim 21, wherein the authentication request includes the card information from the authentication server, and
wherein the authentication server is configured to, upon receiving from the image forming apparatus the authentication request including the card information, perform an authentication process based on the card information.

25. The network system according to claim 8, wherein the card information received via the network interface comprises card information received from the authentication server via the network interface.

26. The network system according to claim 25, wherein the card information received from the authentication server comprises card information that the authentication server received and then, without performing an authentication process using the card information, transmitted to the image forming apparatus.

27. The network system according to claim 25, wherein the card information included in the authentication request comprises the card information received from the authentication server, the card information usable by the image forming apparatus to obtain the authentication result by transmitting the authentication request including the card information to the authentication server.

28. The network system according to claim 25, wherein the card information included in the authentication request comprises the card information received from the authentication server, and
wherein the authentication server is configured to, upon receiving from the image forming apparatus the authentication request including the card information, perform an authentication process based on the card information.

* * * * *